US009671269B2

(12) United States Patent
Berger

(10) Patent No.: US 9,671,269 B2
(45) Date of Patent: Jun. 6, 2017

(54) GAS METER AND PARTICLE TRAP

(71) Applicant: ITRON GMBH, Karlsruhe (DE)

(72) Inventor: Sabrina Berger, Karlsruhe (DE)

(73) Assignee: ITRON GMBH, Karlsruhe (DE)

( * ) Notice: Subject to any disclaimer, the term of this patent is extended or adjusted under 35 U.S.C. 154(b) by 0 days.

(21) Appl. No.: 14/896,875

(22) PCT Filed: Jun. 10, 2014

(86) PCT No.: PCT/EP2014/061972
§ 371 (c)(1),
(2) Date: Dec. 8, 2015

(87) PCT Pub. No.: WO2014/198691
PCT Pub. Date: Dec. 18, 2014

(65) Prior Publication Data
US 2016/0109274 A1     Apr. 21, 2016

(30) Foreign Application Priority Data

Jun. 12, 2013   (EP) ...................................... 13171625

(51) Int. Cl.
*G01F 1/66*    (2006.01)
*G01F 15/12*   (2006.01)

(52) U.S. Cl.
CPC ............ *G01F 15/125* (2013.01); *G01F 1/662* (2013.01)

(58) Field of Classification Search
CPC ............ G01F 1/66; G01F 1/68; G01N 33/497
USPC ........ 73/861.28, 861.29, 204.11, 24.01, 23.2
See application file for complete search history.

(56) References Cited

U.S. PATENT DOCUMENTS

| 3,645,138 | A  | * | 2/1972  | Fussell ...................... | G01L 7/18 |
|           |    |   |         |                               | 73/747    |
| 7,093,502 | B2 | * | 8/2006  | Kupnik ...................    | G01F 1/662 |
|           |    |   |         |                               | 73/861.27 |
| 7,121,134 | B2 | * | 10/2006 | Rich ......................   | A61B 5/097 |
|           |    |   |         |                               | 73/23.2   |

(Continued)

FOREIGN PATENT DOCUMENTS

| FR | 2776379 | 9/1999 |
| GB | 1207156 | 9/1970 |

(Continued)

OTHER PUBLICATIONS

International Searching Authority, International Search Report and the Written Opinion issued in connection with International Application No. PCT/EP2014/061972, dated Sep. 22, 2014, 7 pages.

(Continued)

*Primary Examiner* — Jewel V Thompson
(74) *Attorney, Agent, or Firm* — Hanley, Flight & Zimmerman, LLC.

(57) ABSTRACT

Particle traps and meters fitted with particle traps are described for removing particles from a gas flowing through a gas meter, for example, removing particles from a gas flowing through an ultrasonic gas meter serving a domestic property. In one example, the particle trap has a body which defines a space defined by first and second portions of the body and housing a filter, an inlet through which gas can enter the space, and an outlet through which the gas can exit the space. The inlet and outlet are defined in the first portion and second portion is spaced away from the outlet.

17 Claims, 4 Drawing Sheets

(56) References Cited

U.S. PATENT DOCUMENTS

| | | | | |
|---|---|---|---|---|
| 2005/0109080 A1* | 5/2005 | Hok | ................ | G01N 29/036 |
| | | | | 73/24.01 |
| 2009/0217743 A1* | 9/2009 | Falkenberg | .............. | G01N 5/04 |
| | | | | 73/61.72 |
| 2014/0251003 A1* | 9/2014 | Sonnenberg | .......... | G01F 1/6842 |
| | | | | 73/204.11 |

FOREIGN PATENT DOCUMENTS

| | | | | |
|---|---|---|---|---|
| JP | WO 2012169202 A1 * | 12/2012 | ............. | G01F 1/662 |
| WO | 2012169202 | 12/2012 | | |

OTHER PUBLICATIONS

European Patent Office, Extended European Search Report issued in connection with European Patent Application No. 13171625.0, dated Nov. 6, 2013, 5 pages.

\* cited by examiner

GAS METER AND PARTICLE TRAP

FIELD

The present disclosure relates to a particle trap for removing particles from a gas flowing through a gas meter, and gas meters fitted with such a particle trap.

BACKGROUND

Gas supplying a property may carry contaminant particles. It is important that gas meters, in particular ultrasonic gas meters, through which gas enters a property are protected from such particles in order to ensure proper working of the meter. Therefore it is necessary that any contaminant particles that are present in the gas stream are removed, at least to an acceptable level, prior to entry of the gas to a measurement unit of the meter.

Techniques of passing the gas through a filter prior to the gas entering the measurement unit of the meter are known. However, this approach has the drawback that, with time, the filter becomes clogged by the contaminant particles, thereby obstructing the gas flow and causing the gas pressure entering the meter to exceed a permissible level.

In accordance with European standard EN 14236, which is herein incorporated by reference, ultrasonic gas meters must be tested to ensure that they are immune to four separate batches of dust, each batch having 95% of the appropriate size range given below:

a) 0 µm to 100 µm Average size (50±10) µm;
b) 100 µm to 200 µm Average size (150±10) µm;
c) 200 µm to 300 µm Average size (250±10) µm;
d) 300 µm to 400 µm Average size (350±10) µm.

Each of the above batches shall have a composition by mass of:

Black iron oxide ($Fe_3O_4$) 79%
Red iron oxide (FeO) 12%
Mineral silica flour (SiO) 8%
Paint residual flake 1%

To pass the test, a gas meter filter must not become clogged by the largest particles used in the test.

SUMMARY

In a first aspect there is provided a gas meter having a particle trap for removing particles from a gas flowing through the meter as defined in claim 1.

In some embodiments, the particle trap has a body which defines a space defined by the first and second portions of the body and housing a filter, an inlet through which gas can enter the space, and an outlet through which the gas can exit the space. The inlet and outlet are defined in the first portion and the second portion is spaced away from the outlet.

Advantageously, since the second portion is spaced away from the outlet, particles in the gas flowing from the inlet to the outlet can accumulate adjacent the second portion and hence be removed from the gas flowing through the outlet.

In some embodiments, the gas meter is disposed such that, when the gas meter is installed, the outlet occupies a position above the second portion.

Advantageously, this may enhance accumulation of particles adjacent the second portion since particles will tend to fall away from the outlet under gravity towards the second portion.

More generally, in some embodiments the second portion of the particle trap is opposite the outlet or is to one side of the outlet. In some embodiments, where the particle trap is oriented such that the outlet is in an upper aspect of the trap, the second portion is opposite and below the outlet, across the space. In some embodiments, where the particle trap is oriented such that the outlet is on a side aspect of the particle trap, the second portion is to one side below the outlet. In either situation, there is a portion of the space below the outlet, so that particles can accumulate in that portion.

For the specific construction of the gas meter embodiment described below, gas enters the meter via an inlet port and/or gas exits the meter via an outlet port provided in a wall of a housing of the gas meter. In some embodiments the inlet and outlet ports are provided on the same wall of the housing of the gas meter.

In this construction, where the gas meter is installed such that the wall of the gas meter housing provided with the inlet and outlet ports is oriented to be the top wall of the gas meter, the particle trap is oriented such that particles accumulate on a bottom wall of the particle trap. Where the gas meter is installed such that the wall of the gas meter housing provided with the inlet and outlet ports is oriented to be a side wall of the gas meter, the particle trap is oriented such that particles accumulate on a side wall of the particle trap.

In some embodiments, the particle trap defines a longitudinal axis and a transverse axis substantially perpendicular to the longitudinal axis. The dimension of the particle trap in the transverse direction may be less than the length of the particle trap in the longitudinal direction. For example, the particle trap may be an elongate cylinder, an elongate cuboid, or any other suitably elongate shape.

The inlet and outlet may be spaced along the longitudinal axis of the particle trap. Advantageously, when in use, this ensures the gas flows along the longest axis of the particle trap, and therefore through the longest portion of the filter. Ensuring the gas flows along the longest portion of the filter maximises the volume of filter through which the gas passes and therefore increases the removal of particles from the gas.

In some embodiments the particle trap is made from a plastics material.

Optionally the filter may be a fiberglass pad. In some embodiments the filter is made of a fiberglass weave, for example, an un-coated elastic fiberglass weave.

In some embodiments, the filter defines a longitudinal axis and a transverse axis substantially perpendicular to the longitudinal axis. The thickness of the filter in the transverse direction may be less than the length of the filter in the longitudinal direction. For example, the filter may be an elongate cylinder, an elongate cuboid, or any other suitable shape.

The longitudinal axis of the filter may be the same as that of the particle trap and the transverse axis of the filter may be the same as that of the particle trap.

In some embodiments the thickness of the filter in the transverse direction is between 20 and 80 mm, optionally, 30 mm, 40 mm, 50 mm, 60 mm or 70 mm. In other embodiments the thickness of the filter in the transverse direction is between 0 mm and 100 mm.

The density of the weave of the filter may decrease in a direction away from the outlet. For the specific construction of the gas meter embodiment described below, the density of the weave of the filter may decrease from the first portion to the second portion across the space.

In some embodiments, the density of the filter is graduated between an area of high density and an area of low density in a direction away from the outlet. In such embodiments, gas flowing through the portion of the filter having a higher density will be impeded by the filter to a greater extent than gas flowing through the portion of the filter having a lower density. Advantageously this enables the flow of gas to be directed by the filter.

Alternatively the filter comprises a stepped increase density. In some embodiments, the filter has a single (or more than one) stepped decrease in density in a direction away from the outlet.

In some embodiments, the filter is oriented in the particle trap such that the portion of the filter having the highest density is provided adjacent the first portion, hence the inlet and outlet. Advantageously, this encourages the gas to flow through the entire filter by favouring the path of least resistance through the portion of the filter having the lower density, thereby facilitating the removal of particles from the gas, by ensuring substantially the entire filter material is active in removing particles from the gas. The trap retains the particles adjacent the second portion of the trap while the gas flows through the filter.

The region of highest density of the filter may be such that particles, as defined in accordance with EN 14236 (in one or more of the size ranges (a)-(d) listed above and/or in the composition or any one or more of its constituents listed above), in a gas supply to which the gas meter is connected will not become lodged in the weave, but will accumulate adjacent the second portion. Advantageously, this eliminates or substantially reduces particles becoming lodged in the filter and hence blocking the filter to the flow of gas. Instead the filter acts as a baffle, such that the flow of particles in the gas is obstructed by the filter, for instance the fibres of the filter. Consequently the particles fall to the second portion of the particle trap under gravity and collect there. Therefore, the filter does not become clogged with contaminant particles removed from the gas.

In some embodiments the filter is configured such that particles of $Fe_3O_4$ with a diameter of less than 300 μm accumulate adjacent the second portion. In some embodiments the filter is configured such that particles of $Fe_3O_4$ with a diameter of less than 400 μm accumulate adjacent the second portion. Because the particles in question accumulate adjacent the second portion, that is in a portion of the space below the outlet, they do not clog the remainder of the filter.

The filter may generally comprise or consist of a weave of fibres. The density of the filter may be determined by the density of the weave or may be defined by a change in fibre thickness, or any other suitable way. The filter may equally be constituted otherwise than by a weave, for example like a sponge or by an assembly of porous layers, with the density being defined accordingly by material and/or pore dimensions.

The gas meter may comprise a housing having more than one part. In some embodiments the housing has an upper portion and a lower portion. The particle trap may be held in place by the upper and lower portions.

In some embodiments the upper portion comprises an inlet conduit and an outlet conduit. The particle trap may be held in place by the inlet conduit, the outlet conduit and the lower portion. Alternatively the inlet conduit and outlet conduit may be provided by the lower portion, such that the particle trap may be held in place by the inlet conduit, the outlet conduit and the upper portion.

The outlet conduit may comprise an outlet pipe and/or a gas flow measurement unit. The particle trap may be held in place by any portion of the outlet conduit.

The particle trap may comprise a plurality of resilient feet. These may be positioned to abut the lower portion. Advantageously, these feet enable the particle trap to be stabilized when fitted into the gas meter. In particular, the feet compensate tolerances to ensure that the particle trap is held securely in the interior of the meter.

In some embodiments, the inlet of the particle trap is connected to an inlet conduit of the gas meter. In such embodiments, the outlet of the particle trap may be in fluid communication with the interior of the gas meter. Alternatively, the outlet of the particle trap is connected to an outlet conduit of the gas meter. In such embodiments, the inlet of the particle trap may be in fluid communication with the interior of the gas meter.

The gas meter may be an ultrasonic gas meter.

In some embodiments the gas meter is a domestic gas meter. The gas meter may instead be a gas meter for metering in a commercial or industrial context.

In a second aspect there is provided a particle trap for removing particles from a gas flowing through a gas meter.

In some embodiments, the particle trap has a body which defines a space for housing a filter between first and second portions of the body, an inlet through which gas can enter the space, and an outlet through which the gas can exit the space. The inlet and outlet are defined in the first portion and the second portion is spaced away from the outlet.

In some embodiments, the particle trap can only adopt a single orientation when fitted to the gas meter. Alternatively, there may be a plurality of possible orientations of the particle trap when fitted into the gas meter which result in the particle trap being oriented such that the particles will collect adjacent the second portion. The particle trap may comprise at least one orienting feature to orient the trap in the gas meter such that the outlet is above the second portion. Advantageously, such locating features ensure that the particle trap adopts the correct orientation, or one of the plurality of correct orientations, when fitted into the gas meter. In some embodiments, the at least one orienting feature may be a guiding projection from a wall of the housing, a resilient catch for clipping the trap in place with respect to the meter, the configuration of the body itself, or any other suitable locating means that will be well known in the art or a combination of these.

Embodiments of the second aspect may be configured as described above in relation to the first aspect.

It will be understood that, while the present disclosure refers to the flow of gas and to a gas meter, it would be clear to those skilled in the art that a particle trap as described above may be used to remove particles from any fluid, gas or liquid, such fluid flowing through any device.

Accordingly, in a third aspect, the present disclosure provides a particle trap for removing particles from a fluid flowing through a device, the particle trap having a body which defines a space defined by first and second portions of the body and housing a filter; an inlet through which fluid can enter the space; and an outlet through which the fluid can exit the space. The inlet and outlet are defined in the first portion and the second portion is spaced away from the outlet.

Embodiments of the third aspect may be configured as described above in relation to the first and second aspects.

BRIEF DESCRIPTION OF DRAWINGS

An embodiment of a gas meter having a particle trap for removing particles from a gas flowing through the gas meter will now be described, by way of example only, with reference to the accompanying drawings in which.

SPECIFIC DESCRIPTION OF CERTAIN EXAMPLE EMBODIMENTS

Figure 1:
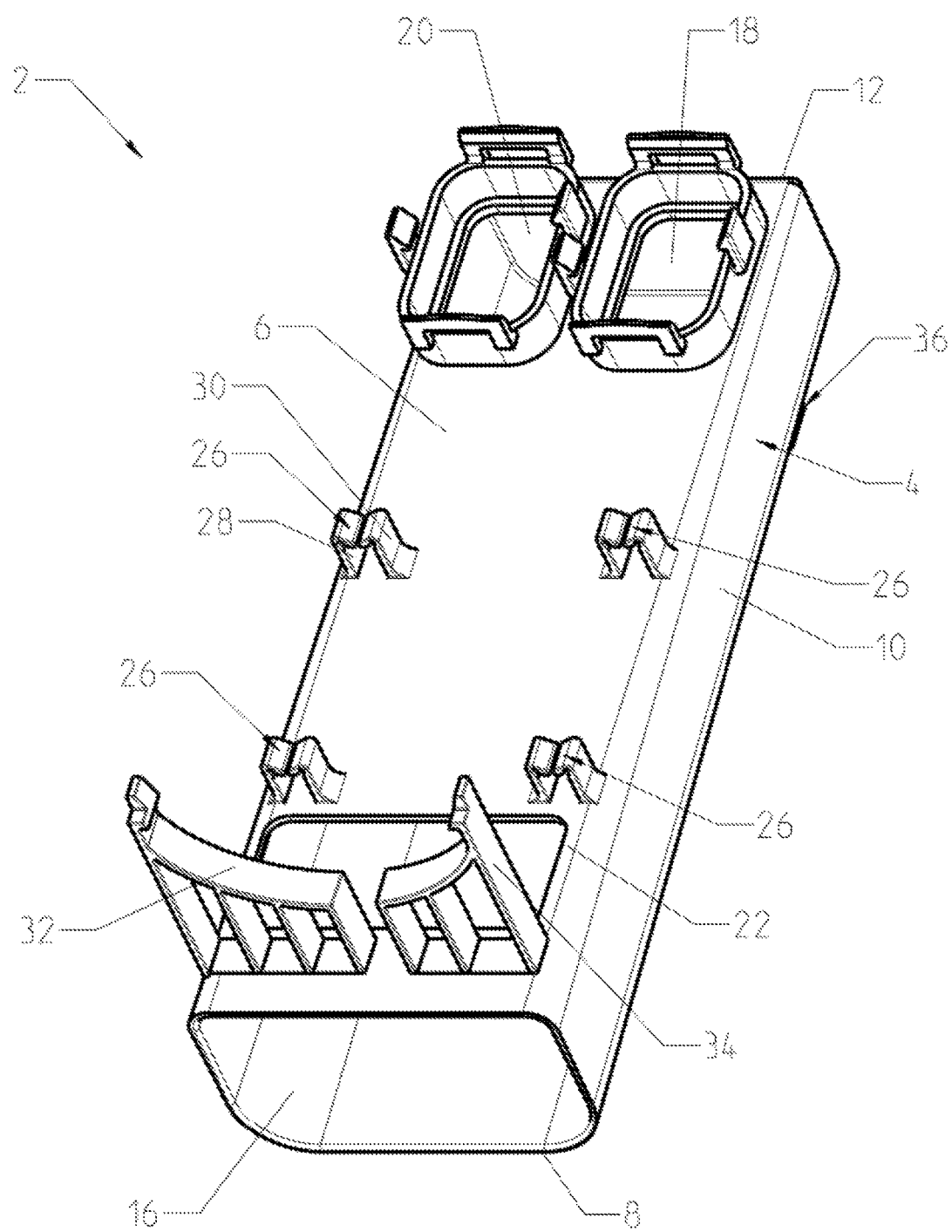
FIG. 1 shows a perspective view of a particle trap.
Figure 2:
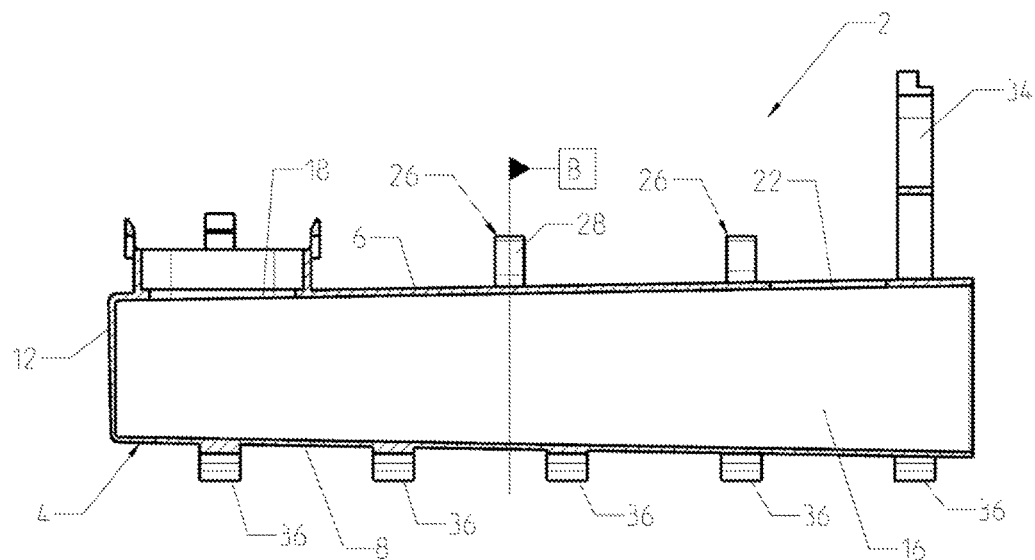
FIG. 2 show a cross-sectional side view of the particle trap of FIG. 1.
Figure 3:
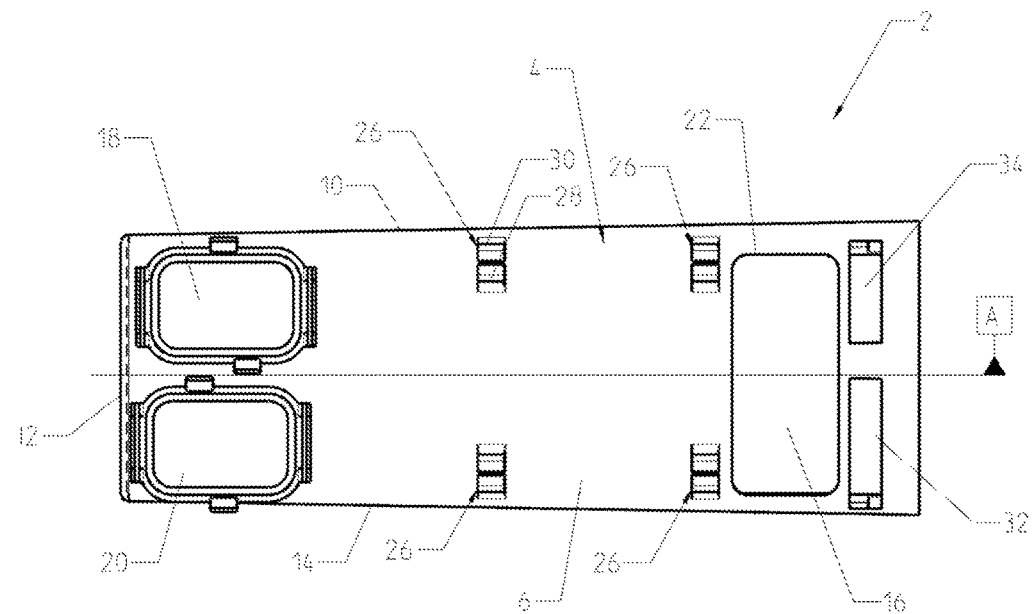
FIG. 3 shows a plan view of the top wall of the particle trap of FIG. 1.

With reference to FIGS. 1 to 4, a particle trap 2 comprises a housing 4. The housing 4 has a top wall 6, a bottom wall 8, a first side wall 10, a second side wall 12 and a third side wall 14, which define a space 16. The particle trap is depicted in an orientation in which the outlet is in an upper aspect of the trap. If the gas meter housing the trap is installed in a different orientation with the outlet to one side, the top and bottom walls will become side walls and the side wall will become top and bottom walls. For convenience, the following description is made in terms of the orientation depicted in FIGS. 1 and 4, without loss of generality.

The particle trap 2 is elongate having a substantially rectangular cross section. The particle trap 2 has a longitudinal axis A and a transverse axis B substantially perpendicular to the longitudinal axis A. The thickness of the particle trap 2 along the transverse axis B is significantly less than the length of the particle trap 2 along the longitudinal axis A, such that the trap is relatively thin in the transverse direction.

The top wall 6 is provided with a pair of inlets 18, 20 and an outlet 22 through which gas may flow into and out of the space 16 respectively.

Figure 4:
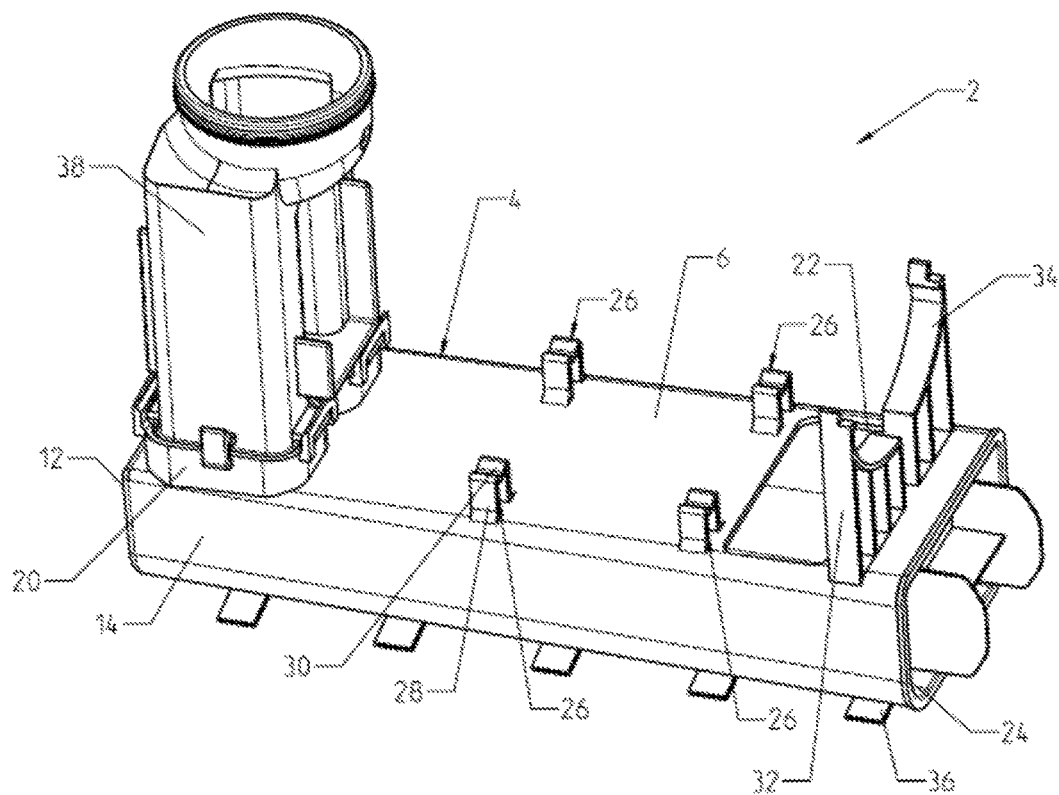
FIG. 4 shows a perspective view of the particle trap of FIG. 1 when connected to an inlet pipe.

A cap 24, as shown in FIG. 4, is provided to close the space 16 along a fourth side wall of the housing 4.

The top wall 6 is provided with a plurality of locating clips 26, in this case four locating clips 26. Each locating clip 26 comprises a pair of resilient projections 28, 30 to secure cables inside the gas meter.

The top wall 6 is provided with a pair of guiding projections 32, 34.

The bottom wall 8 is provided with a plurality of resilient feet 36, in this case ten feet, which facilitate stabilization of the particle trap 2 in the gas meter. In particular, the feet 36 compensate tolerances to ensure that the housing 4 is securely held in the interior of the meter.

As shown in FIG. 4, the pair of inlets 18, 20 are coupled to a gas supply via an inlet pipe or conduit 38.

Figure 5:
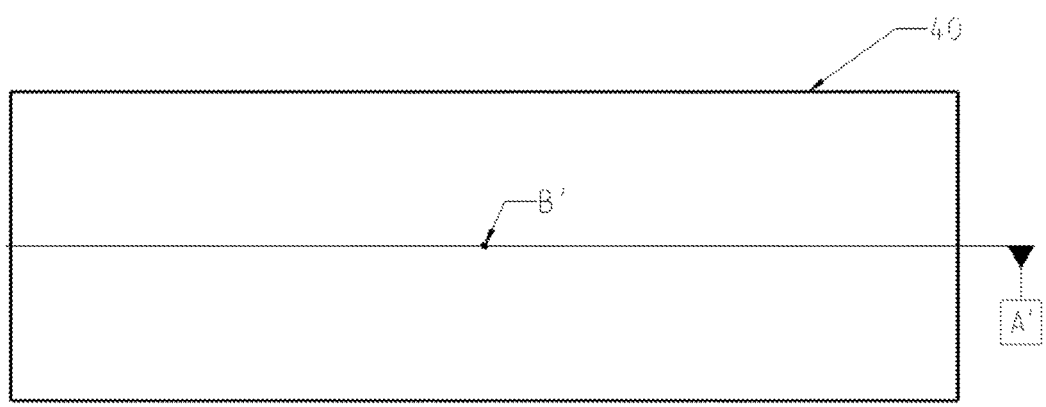
FIG. 5 shows a plan view of a filter.
Figure 6:
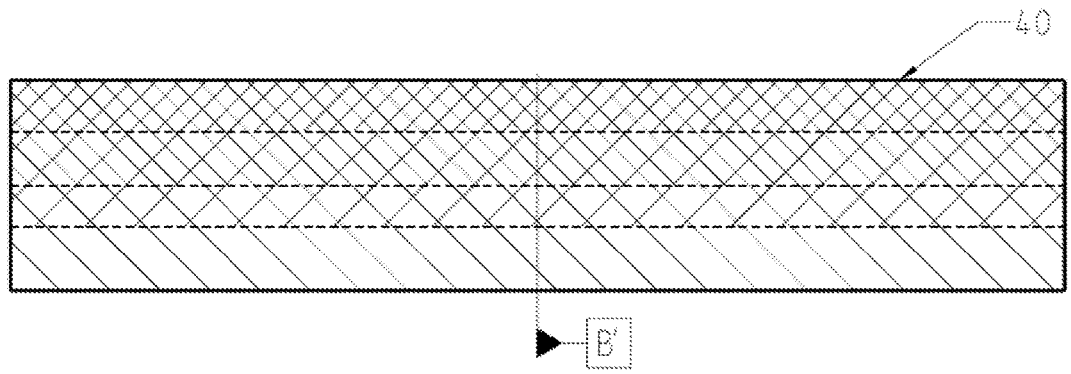
FIG. 6 shows a schematic cross-sectional side view of the filter of FIG. 5.

When in use, the particle trap 2 is fitted with a filter 40, now described with reference to FIGS. 5 and 6. The filter is a fiberglass weave, specifically an uncoated elastic fiberglass weave in some embodiments.

The filter 40 is elongate having a substantially rectangular cross section, with a longitudinal axis A' and a transverse axis B' substantially perpendicular to the longitudinal axis A'. The thickness of the filter 40 along the transverse axis B' is significantly less than the length of the filter 40 along the longitudinal axis A', such that the filter is relatively thin in the transverse direction. Typically, the thickness of the filter along the transverse axis B' is approximately 50 mm.

The filter 40 varies in density according to the density of the fiberglass weave. Referring to FIG. 6, as shown by the cross-hatching, the density of the filter 40 is varied such that density increases the direction of the transverse axis B', in other words, along the short length of the filter across the space 16.

The region of the filter 40 having the highest density is configured, in particular of a density, such that particles, for example as defined in accordance with EN 14236, in a gas supply to which the gas meter is connected will not become lodged in the weave.

Figure 7:
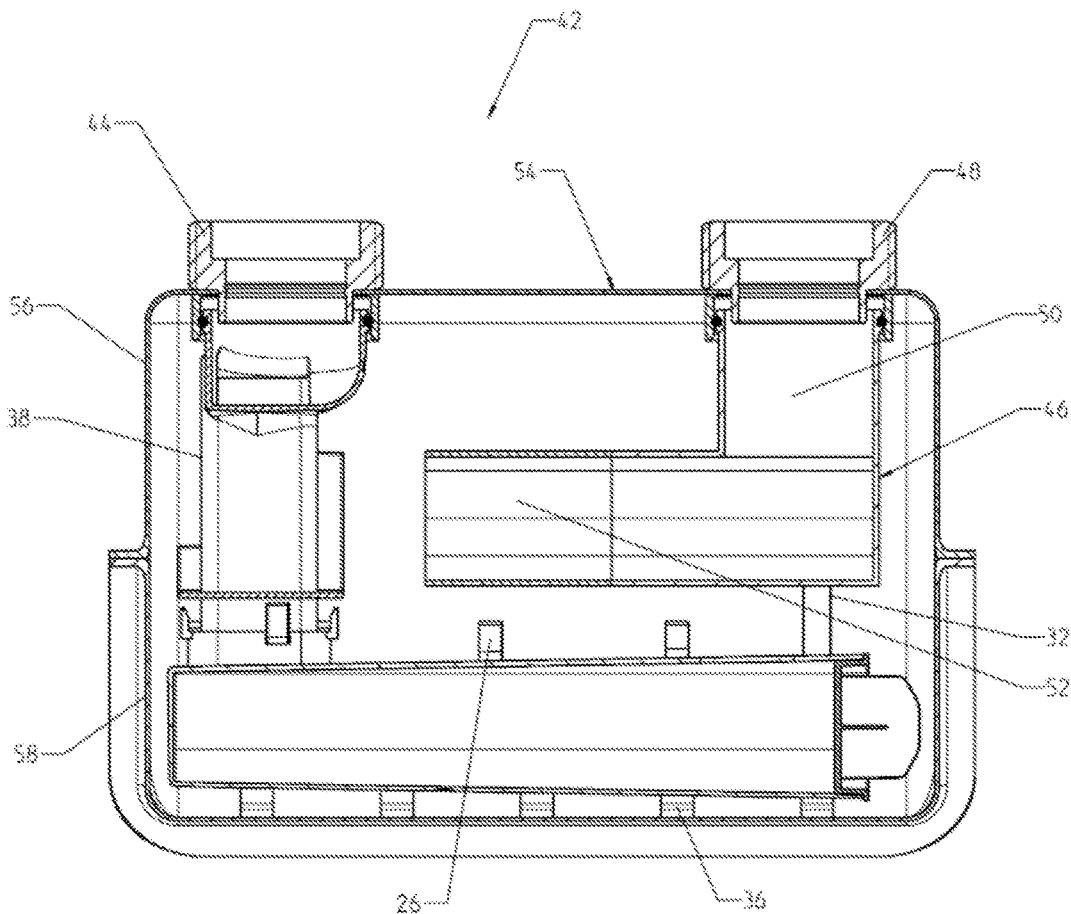
FIG. 7 shows a schematic of the particle trap of FIG. 1 coupled to a gas meter.

Referring to FIG. 7, the particle trap 2 is fitted into a gas meter 42 such that the inlet pipe 38 is connected to an inlet boss 44 of the gas meter 42 and the outlet 22 of the trap 2 is in fluidic communication with the interior of the gas meter 42 and hence with an outlet conduit 46. The outlet conduit 46 is connected to an outlet boss 48 and comprises an outlet pipe 50 and a gas flow measurement unit 52. The guiding projections 32, 34 of the particle trap 2 correspond to the shape of the outlet conduit 46 and so serve to facilitate orienting the outlet conduit 46 in the gas meter 42.

The gas meter 42 measures flow of gas using an arrangement of ultrasonic transducers in the flow path, as is well known for ultrasonic gas meters. Specifically, flow in the gas flow measurement unit 52 is measured.

In some embodiments, the gas meter 42 has a housing 54 comprising an upper portion 56 and a lower portion 58. The bosses 44 and 48 are provided in the upper portion 56.

The particle trap 2, inlet pipe 38 and outlet conduit 46 are securely held in relation to each other by a pressure fit with the upper portion 56 applying a force to the inlet pipe 38 and outlet conduit 46 and the lower portion 58 applying a force to the particle trap 2.

Specifically, the inlet and outlet bosses 44, 48 of the upper portion 56 sealingly engage, respectively, the inlet pipe 38 and outlet conduit 46. Independently, the lower portion 58 engages the feet 36. The resilience of the feet 36 allows for manufacturing tolerances in the housing portions 56, 58 and the components held together therebetween by absorbing small variations in the respective relevant dimensions by elastic deformation.

To fit the particle trap 2 to the gas meter unit 42, a filter 40 is first placed in the space 16 of the particle trap 2, such that the density of the filter 40 decreases from the top wall to the bottom wall, with a high density side of the filter 40 positioned adjacent the top wall 6 of the housing 4, and hence adjacent the pair of inlets 18, 20 and the outlet 22. The inlet pipe 38 and the cap 24 are also connected to the particle trap 2. The inlet pipe 38 and the outlet pipe 50 are fitted to the gas meter 42 by pressing the inlet pipe 38 into the inlet boss 44 and the outlet pipe 50 into the outlet boss 48 of the gas meter 42. The outlet pipe 50 is connected to the gas flow measurement unit 52. The locating clips 26 of the particle trap 2 secure cables inside the gas meter 42, and the particle trap 2 and the outlet conduit 46 are aligned by the guiding projections 32, 34 of the particle trap 2. The assembly is completed by securing the upper portion 56 and the lower portion 58 of the housing 54 together to seal the interior of the gas meter 42.

In use, gas flows from a gas supply to the pair of inlets 18, 20 via the inlet pipe 38. From the inlets 18, 20 the gas flows through the space 16 and the filter 40 along the longitudinal axes A, A' of the particle trap 2 and the filter 40, and out of the particle trap 2 via outlet 22. From the outlet 22, the gas flows to and through the flow measurement unit 52 and the outlet pipe 50. The gas then leaves the gas meter 42 through the outlet boss 48.

As the gas flows through the filter 40 it flows through the weave of the fiberglass fibres of the filter and contaminant particles in the gas are obstructed by the fibres of the filter, in other words the filter acts as a baffle, causing the particles fall to the bottom wall 8 of the particle trap 2 under gravity and collect there. Consequently the filter does not become clogged with contaminant particles removed from the gas. If the meter is installed in a different orientation with the bosses 44, 48 to one side of the meter, rather than on top, the contaminant particles will fall to a lower one of the side walls 10, 14.

When traveling through the filter 40, the portion of the filter 40 having the lowest density will provide the least resistance to the flow of gas. Therefore, since the filter 40 is oriented in the particle trap 2 such that side of the filter 40 having highest density is adjacent the top wall 6 of the housing 4, and hence adjacent the pair of inlets 18, 20 and the outlet 22, the gas flow is encouraged to occupy the entire thickness of the filter along its transverse axis B'. Hence, the cross-section of the filter active in removing particles from the gas is increased, as compared to a situation in which flow is in effect confined to only a portion of the filter 40.

It will be understood that the above description is of specific embodiments by way of example only and that many modifications, juxtapositions and alterations will be within the skilled person's reach and are intended to be covered by the scope of the appendent claims. For example, it would be clear to those skilled in the art that a particle trap as described above may be used to remove particles from any fluid, such fluid flowing into any device.

The invention claimed is:

1. A gas meter having a particle trap for removing particles from a gas flowing through the gas meter, the particle trap having a body which defines:
   a space defined by first and second portions of the body and housing a filter;
   an inlet through which gas can enter the space; and
   an outlet through which the gas can exit the space;
   wherein the inlet and outlet are defined in the first portion and the second portion is spaced away from the outlet, a density of the filter decreases in a direction away from the outlet, and a portion of filter having a highest density is adjacent the inlet and outlet.

2. A gas meter according to claim 1, wherein when the gas meter is installed, the outlet is above the second portion.

3. A gas meter according to claim 1, wherein the second portion is opposite the outlet or is to one side of the outlet.

4. A gas meter according to claim 1, wherein the particle trap defines a longitudinal axis and a transverse axis generally perpendicular to the longitudinal axis, wherein the thickness of the space in the transverse direction is less than the length of the space in the longitudinal direction.

5. A gas meter according to claim 4, wherein the inlet and outlet of the particle trap are spaced along the longitudinal axis.

6. A gas meter according to claim 1, wherein the filter comprises a weave of fibers.

7. A gas meter according to claim 1, wherein the filter is configured to accumulate adjacent the second portion particles of $Fe_3O_4$ with a diameter of less than 400 μm.

8. A gas meter according to claim 1, wherein the filter does not become clogged with particles having an average particle size in a gas supply to which the gas meter is connected.

9. A gas meter according to claim 1, wherein the gas meter is an ultrasonic meter.

10. A gas meter according to claim 1, wherein the gas meter has an upper portion and a lower portion, the particle trap being held in place by a force applied by the upper and lower portions.

11. A gas meter according to claim 10, wherein the upper portion comprises an inlet conduit and an outlet conduit, the particle trap being held in place by the inlet conduit, the outlet conduit and the lower portion.

12. A gas meter according to claim 10, wherein the particle trap comprises a plurality of resilient feet disposed to abut the lower portion.

13. A body for a particle trap configured for fitting into a gas meter housing to form a gas meter, the particle trap for removing particles from a gas flowing through the gas meter, the body for the particle trap comprising:
   a first portion and a second portion;
   a space defined by the first and the second portions and configured to house a filter;
   an inlet through which gas can enter the space; and
   an outlet through which the gas can exit the space;
   wherein the inlet and outlet are defined in the first portion and the second portion is spaced away from the outlet, a density of the filter decreases in a direction away from the outlet, and a portion of filter having a highest density is adjacent the inlet and outlet.

14. A body for a particle trap according to claim 13, wherein when the gas meter is installed, the outlet is above the second portion.

15. A body for a particle trap according to claim 13, wherein the second portion is opposite the outlet or is to one side of the outlet.

16. A body for a particle trap according to claim 13, wherein the gas meter has an upper portion and a lower portion, the particle trap being held in place by a force applied by the upper and lower portions.

17. A body for a particle trap according to claim 13, wherein the filter is configured to accumulate adjacent the second portion particles of $Fe_3O_4$ with a diameter of less than 400 μm.

* * * * *